Patented Feb. 23, 1932

1,846,356

UNITED STATES PATENT OFFICE

WILLETT C. PIERSON, OF EAST ORANGE, NEW JERSEY, ASSIGNOR TO LEAGUM CORPORATION OF DELAWARE, OF NEW YORK, N. Y., A CORPORATION OF DELAWARE

THERMOPLASTIC MOLDING COMPOSITION AND PROCESS OF MAKING THE SAME

No Drawing.      Application filed December 21, 1927. Serial No. 241,728.

This invention relates to thermo-plastic compositions and to processes of making the same, and provides improvements therein.

The invention provides a thermo-plastic composition which may be made largely from inexpensive ingredients, and consequently produced at low cost. Leather scrap is used in large part.

The invention further provides a product which when molded under heat and pressure and mixed with a filler, results in a molded product having many properties desirable in compositions of this general kind. For example, it is tough, water repellant, has considerable tensile strength and good di-electric properties, takes and retains a mold polish, separates readily from a mold, and machines well.

The invention further provides a novel process for producing said thermo-plastic composition.

According to my invention, I take leather, and preferably scrap or waste leather because of its cheapness, and first soften or plump it, by soaking it, the softening or plumping being facilitated by adding an acid or alkali to the soaking water, to form a weak acid or alkali solution. Sulphuric acid I prefer for acidifying, and urea for alkalizing. This plumping also probably results in partially stripping tannic acid or other tanning agents from tanned leather.

After the leather has been softened, it is brought to a gummy state by heating. Preferably the heating is carried on at a temperature which will not cause disintegration of the leather. Good results may be obtained by heating the leather (immersed in water sufficient to cover it) at temperatures between 150–200° F. After having been properly heated, the gummy leather should pull out in long, fine threads, preserving its fibrous character.

I then mix the leather gum with a substance or substances which when later heated with it, as hereinafter described, forms, according to my theory, an emulsion which sets or hardens to form the final product. This substance (or substances) I designate the emulsion solvent. Naphthalene is the substance I preferably add to the gummy leather to form the emulsion.

I also remove water from my leather gum and substitute an organic solvent or solvents having a higher boiling point. I may add ethylene glycol, or glycerine, though I obtain better results by using a mixture of ethylene glycol and glycerine. The substitue solvent (or solvents) for the leather-gum is conveniently mixed with the leather-gum at the same time the emulsion solvent is mixed therewith, the moisture being afterwards expelled.

By adding hexymethylene tetramine (or formaldehyde) which substances I include under the term "methylene substances" I find that the water repellant properties are improved.

After drying, the composition is preferably pulverized.

Colors and fillers may be added before or after drying and pulverizing, as may be desired.

The composition is molded, preferably with the addition of a filler, in heated molds or dies, under pressure. Temperatures of 300–350° F. are suitable for molding, and when molded at these temperatures the composition sets or cures, and does not become plastic again on subsequent heating.

A mode of procedure in carrying out my process is as follows:—

I take a given amount of leather waste, for example 100 pounds, and soak this in water until the leather becomes softened or plumped. In practice, I ordinarily soak the leather for about 12 hours. I ordinarily add about 2% of urea or sulphuric acid to the water, for soaking or plumping.

After the leather has become sufficiently softened in the soaking vat, I remove it and place it in a steam-jacketed kettle, containing just sufficient water to cover the leather. The leather is then heated at a temperature of approximately 190° F. for about one-half hour. The temperature and the duration of heating should preferably be regulated so as not to produce complete disintegration or breakdown of the leather, which after heating should be gummy, and a sample placed between the fingers should pull out in long, fine threads. In the claims, the term "gum", refers to the tacky mass resulting from treating leather as above described. The mass remains tacky at room temperature.

After heating the leather, any water or solution standing in the kettle is run off.

The gummy leather is then conveniently run into a steam-jacketed mixer, containing the substances to be mixed with the leather gum, and which themselves have preferably been mixed previously to the addition of the gummy leather.

The mixture to which the gummy leather is added is preferably made up as follows: Napthalene, amounting to 5% to 15% of the leather scrap, 10% for example (10 pounds in the example given above), is placed in the steam-jacketed kettle. There is also preferably added glycerine and ethylene-glycol, the relative amounts being variable, and also varying somewhat with the amount of naphthalene or equivalent used. As a representative proportion I use glycerine to the amount of 10% of the weight of the leather scrap (10 pounds in the example given), and 1–2 per cent ethylene-glycol (1–2 pounds in the given example). These are preferably mixed together in the mixer at a temperature of 200° F., and a thorough mixing of the said ingredients performed before adding the leather gum.

The leather gum may now be added to the mixed substances in the mixer and the mixing continued until a uniform mixture of the leather gum with the other substances is effected. When properly mixed, a sample should show a varnish-like homogeneous structure when placed on a glass plate.

Hexamethylene tetramine is preferably added to the solution. I preferably add an amount of this equal to about 2% of the scrap leather (2 pounds in the given example). This is preferably added to the solution or mixture of the gummy leather and the other ingredients in a steam-jacketed kettle, and the mixing continued to thoroughly incorporate the hexamethylene tetramine.

The contents of the mixer are then dried to expel moisture, and preferably broken up or pulverized. For drying, I preferably use a vacuum drier, and temperatures of 170–180° F.

Fillers and coloring material may be added to the composition, either before or after drying; preferably the coloring material and fillers are added to the composition while the composition is in a plastic state in the steam-jacketed mixer.

The usual fillers, used in thermo-plastics, such for example as wood flour, asbestos, paper pulp, ground cork, etc., may be used.

The composition may be molded in heated molds. In molding articles with my composition, the usual temperatures of 300–350° F. or thereabout, and pressures of around 2,000 pounds per square inch, may be used.

The composition will soften in the molding dies, take the form and polish of the dies, and also undergo a change; and under the heating set or cure, which I explain according to my theory by the melting of the solvent, its distribution throughout the leather gum and formation of an emulsion. When subsequently subjected to heat, the molded composition does not again become plastic.

The finished molded product is tough, possesses a good appearance, takes a polish from the mold, has high tensile strength and compression strength, and good di-electric properties and separates well from the mold. It is also water repellant.

The materials used for forming my composition are mostly of low cost, and the invention therefore provides a lower cost molding composition and at the some time provides a molded product having substantially equal properties to those obtained by the use of other generally used molding compositions.

The process may be carried out by other modes of procedure and with other materials than those herein specifically described.

What is claimed is:—

1. A composition comprising leather-gum in an organic solvent having a boiling point above that of water, and naphthalene.

2. A composition comprising leather-gum in glycerine, and naphthalene.

3. A composition comprising leather-gum in glycerine and ethylene glycol, and naphthalene.

4. A composition comprising leather-gum in an organic solvent having a boiling point above that of water, naphthalene, and a methylene substance.

5. A composition comprising leather-gum, and naphthalene amounting to 5% to 15% of the leather.

6. A composition comprising leather-gum in an organic solvent having a boiling point above that of water, and naphthalene amounting to 5% to 15% of the leather.

7. The process of making molding compositions comprising heating leather in water to reduce it to the state of a gum, mixing it with an emulsion solvent, and expelling the water from said mass.

8. The process of making molding compositions comprising heating leather in water to reduce it to the state of a gum which is tacky at ordinary temperatures, mixing it with an organic solvent of higher boiling point than water, and expelling the water.

9. The process of making molding compositions comprising heating leather in water to reduce it to the state of gum which is tacky at ordinary temperatures, mixing it with an organic solvent of higher boiling point than water, and expelling the water and also mixing an emulsion solvent therewith.

10. The process of making molding compositions comprising heating leather in water to reduce it to the state of a gum which is tacky at ordinary temperatures, mixing it with an organic solvent of higher boiling point than water, and expelling the water, and also mixing naphthalene therewith.

11. The process of making molding compositions comprising heating leather in water to reduce it to the state of a gum which is tacky at ordinary temperatures, mixing it with an organic solvent of higher boiling point than water, and expelling the water, and also mixing an emulsion solvent and a methylene substance therewith.

12. The process of making molding compositions comprising heating leather in water to reduce it to the state of a gum which is tacky at ordinary temperatures, mixing it with an organic solvent of higher boiling point than water, and expelling the water, and also mixing naphthalene and a methylene substance therewith.

13. The process of making molding compositions comprising heating leather in water to reduce it to the state of a gum which is tacky at ordinary temperatures, mixing it with an organic solvent of higher boiling point than water, and expelling the water, and also mixing 5% to 15% of naphthalene therewith based on the weight of the leather.

14. The method of making molding compositions comprising soaking leather and heating it in water at a temperature below 200° F. to reduce it to the state of a fibrous gum, mixing naphthalene amounting to 5%–15% of the weight of the leather used, glycerine and ethylene glycol therewith, and expelling moisture therefrom.

15. The method of making molding compositions comprising soaking leather and heating it in water at a temperature below 200° F. to reduce it to the state of a fibrous gum, mixing naphthalene amounting to 5%–15% of the weight of the leather used, glycerine, ethylene glycol, and a methylene substance therewith, and expelling moisture therefrom.

16. A composition comprising leather gum and an emulsion solvent, said gum and emulsion solvent being in the form of a solid emulsion which is hard at the temperature of boiling water and insoluble in hot or cold water.

17. A composition comprising leather gum containing an organic solvent and an emulsion solvent, said gum and solvent being in the form of a solid emulsion with said emulsion solvent, which is hard at the temperature of boiling water and insoluble in hot or cold water.

18. A composition comprising leather gum, a methylene substance, and an emulsion solvent, said ingredients being in the form of a solid emulsion, which is hard at the temperature of boiling water and insoluble in hot or cold water.

19. A composition comprising leather gum, a methylene substance, an organic solvent, and an emulsion solvent, said ingredients being in the form of a solid emulsion, which is hard at the temperature of boiling water and insoluble in hot or cold water.

20. A composition comprising leather gum and naphthalene, said gum and naphthalene being in the form of a solid emulsion, which is hard at the temperature of boiling water and insoluble in hot or cold water.

21. A gummy substance composed of leather having the tannic acid used in tanning partially removed therefrom, and tacky at ordinary temperatures resulting from having been heated in water at a temperature between 150° and 200° F.

22. A gumming substance composed of leather having the tannic acid used in tanning partially removed therefrom, and tacky at ordinary temperatures resulting from having been heated in water at a temperature between 150° and 200° F., said gummy substance having water expelled therefrom and containing an organic solvent having a boiling point above that of water.

In witness whereof, I have hereunto signed my name.

WILLETT C. PIERSON.